United States Patent
Meehan et al.

(10) Patent No.: US 9,418,345 B1
(45) Date of Patent: Aug. 16, 2016

(54) SELF-SERVICE VENDING SYSTEM FOR ELECTRIC CONVENIENCE VEHICLES

(71) Applicant: SCOOTERBUG, INC., Woburn, MA (US)

(72) Inventors: Christopher T. Meehan, Weston, MA (US); Kurt D. Ring, Andover, MA (US)

(73) Assignee: ScooterBug, Inc., Orlando, FL (US)

( * ) Notice: Subject to any disclaimer, the term of this patent is extended or adjusted under 35 U.S.C. 154(b) by 445 days.

(21) Appl. No.: 13/644,465

(22) Filed: Oct. 4, 2012

(51) Int. Cl.
*G06Q 10/02* (2012.01)
*E05B 77/00* (2014.01)
*B60R 25/24* (2013.01)

(52) U.S. Cl.
CPC .............. *G06Q 10/02* (2013.01); *E05B 77/00* (2013.01); *B60L 2230/16* (2013.01); *B60R 25/24* (2013.01); *Y02T 90/12* (2013.01); *Y02T 90/125* (2013.01); *Y02T 90/14* (2013.01)

(58) Field of Classification Search
CPC ............ B60L 11/1825; B60L 2200/24; B60L 2200/34; G06Q 10/02; H02J 7/0027; H02J 7/0042
See application file for complete search history.

(56) References Cited

U.S. PATENT DOCUMENTS

| | | | |
|---|---|---|---|
| 3,978,959 | A | 9/1976 | Muellner |
| 4,496,896 | A | 1/1985 | Melocik et al. |
| 5,523,666 | A | 6/1996 | Hoelzl et al. |
| 6,384,717 | B1 | 5/2002 | DeVolpi |
| 6,525,510 | B1 * | 2/2003 | Ayano et al. ................. 320/109 |
| 6,850,153 | B1 * | 2/2005 | Murakami et al. ......... 340/425.5 |
| 7,023,177 | B1 | 4/2006 | Bussinger |
| 7,434,674 | B1 | 10/2008 | Bain |
| 7,748,511 | B1 | 7/2010 | Maher |
| 2003/0022138 | A1 | 1/2003 | Korala |
| 2007/0001804 | A1 | 1/2007 | Lanier et al. |
| 2008/0010105 | A1 * | 1/2008 | Rose et al. ........................ 705/5 |

(Continued)

FOREIGN PATENT DOCUMENTS

WO  WO 2011014142 A1 *  2/2011

OTHER PUBLICATIONS

Purdue University: Van Reservations <http://www.purdue.edu/pat/mainnav/transportation/car/van.htm> (<http://web.archive.org/web/20111001050502/http://www.purdue.edu/pat/mainnav/transporta-tion/car/van.htm> captured on Oct. 1, 2011.*

(Continued)

*Primary Examiner* — Brian Tallman
(74) *Attorney, Agent, or Firm* — Dentons US LLP

(57) ABSTRACT

Systems and methods for self service vending of electric convenience vehicles (ECVs) are disclosed. Various embodiments of the systems and methods disclosed herein allow convenient rental of ECVs to visitors of large venues without requiring dedicated service personnel. In one embodiment, a self service vending system may include a charging station configured to charge an ECV, a locking mechanism configured to lock the ECV, and a terminal configured to process a reservation of the ECV and to provide a code for operating the ECV based on the reservation. In some embodiments, a self service vending system may include a docking station. Embodiments may further include a reservation management system. Computer systems implementing methods of self service vending of ECVs are also disclosed.

43 Claims, 16 Drawing Sheets

(56) References Cited

U.S. PATENT DOCUMENTS

| | | | |
|---|---|---|---|
| 2009/0174363 A1* | 7/2009 | Maher | 320/107 |
| 2010/0030590 A1 | 2/2010 | Sodaro | |
| 2010/0089846 A1 | 4/2010 | Navarro Ruiz et al. | |
| 2010/0228405 A1* | 9/2010 | Morgal et al. | 701/2 |
| 2011/0074350 A1* | 3/2011 | Kocher | 320/109 |
| 2011/0140656 A1* | 6/2011 | Starr et al. | 320/109 |

OTHER PUBLICATIONS offroad-ed.com: Utah offroading course <http://www.offroad-ed.com/utah/> (<http://web.archive.org/web/20120305234115/http://www.offroad-ed.com/utah/> captured on Mar. 3, 2012).*

"Special Needs at Sea Kiosks Provide Rental, Pick-Up and Drop Off Wheelchairs and Other Aides at Seattle's New Pier 91 Cruiseship Terminal" dated Jun. 25, 2009, pp. 1-3.

* cited by examiner

Reservation Info to reserve equipment

1402 — Rental Locations
Mall Entrance (Self-Service)
East Entrance (Staffed)
West Entrance (Self-Service)

1404 — Pricing

| ECV Price | |
|---|---|
| $ 5.00 total | |
| Deposit: $100.00 | |

| Wheelchair Price | |
|---|---|
| $12.00 total | 0 - 4 Hours |
| $20.00 total | 4 - 24 Hours |

1406 — Reservation Information
Venue: National Air and Space Museum
Location: Mall Entrance
Location: ECV
Location: 05/03/2011    12 : 00

End Date/Time: 05/03/2011    1 : 00
PM

[Next] [Cancel]

FIG. 14

SELF-SERVICE VENDING SYSTEM FOR ELECTRIC CONVENIENCE VEHICLES

BACKGROUND

1. Field of the Invention

The present invention is generally directed to vending systems and methods and more specifically to vending systems and methods for mobility vehicles.

2. Description of Background

Visitors to large venues such as theme parks and airports may need mobility vehicles for personal transportation around the venue. Examples of mobility vehicles include scooters, strollers and wheelchairs. Mobility vehicles may be electric. An electric convenience vehicle (ECV) may generally refer to a powered scooter device, such as a battery powered device, that allows a person to sit or stand on the unit and ride around at their convenience.

SUMMARY OF INVENTION

According to aspects of the present invention, it is appreciated that personal transportation around a large venue may be a daunting or impossible task for some visitors. Even if mobility vehicles are available for rental at the venue, renting a mobility vehicle may also be challenging. Some venues may provide customer service personnel who may help visitors with mobility vehicle rentals. However, disabled visitors may not be able to easily reach the customer service desk or rental booth in a large venue. Furthermore, providing dedicated service personnel to support renting mobility vehicles at multiple convenient locations throughout the venue may be costly. Accordingly, there is a need for a self service vending system for mobility vehicles such as electric convenience vehicles (ECVs).

According to aspects of the present invention, a self-service vending system may include a terminal or a kiosk based vending device that may be placed in a public or private venue, thereby allowing a visitor to that venue to rent an ECV using the terminal. Self-service vending systems may be placed at multiple convenient locations throughout a venue to allow convenient access. For example, self-service vending systems may be provided at a large convention center with many halls and entrances from parking lots and garages. Placing self-vending systems at entrance areas, garage structures and bus drop off locations will facilitate ease of access to those who need a mobility device to be able to get to all functions and facilities at the convention center. In another example, self-service vending systems may be provided at a theme park, a casino or casino resort complex with many entrances and parking structures. Again, having self-vending systems at entrance areas, garage structures and bus drop off locations will facilitate ease of access to visitors who need a mobility device to be able to get to all functions and facilities at such a large dispersed environment as a theme park, casino or a resort casino. In other examples, self-service vending systems may be provided in various environments such as hospitals, shopping malls, airports, museums, stadiums and other short stay venues where visitors may need a mobility device for personal transportation.

According to one aspect, there is provided a system for self-service vending of an electric convenience vehicle, the system comprising a charging station configured to charge the electric convenience vehicle, a locking mechanism configured to lock the electric convenience vehicle, and a terminal configured to process a reservation of the electric convenience vehicle and to provide a code for operating the electric convenience vehicle based on the reservation. The terminal may be configured to process the reservation by at least one of creating the reservation and receiving the reservation. The terminal may be configured to receive a payment associated with the reservation. In some embodiments, the charging station may be configured to inductively charge the electric convenience vehicle.

In some embodiments, the system may further include a docking station. The docking station may include the charging station and the locking mechanism. The locking mechanism may be configured to lock the electric convenience vehicle to the docking station. The terminal may be configured to control the locking mechanism so as to unlock the electric convenience vehicle from the docking station based on the reservation. The docking station may be configured to communicate wirelessly with the terminal. The charging station and the locking mechanism may be coupled to allow charging of the electric convenience vehicle in response to locking the electric convenience vehicle to the docking station.

In some embodiments, the locking mechanism may include an engagement mechanism configured to lock the electric convenience vehicle to the docking station and a release mechanism configured to unlock the electric convenience vehicle from the docking station. The engagement mechanism may be configured to engage a locking catch of the electric convenience vehicle and to automatically lock in response to engaging the locking catch.

In some embodiments, the charging station may be configured to independently charge each one of a plurality of electric convenience vehicles. The docking station may include a plurality of locking mechanisms. Each locking mechanism of the plurality of locking mechanisms may be configured to lock and unlock a respective one of the plurality of electric convenience vehicles. The docking station may further include a plurality of docks. Each dock of the plurality of docks may include at least one locking mechanism of the plurality of locking mechanisms and each dock may be configured to lock and charge at least one of the plurality of electric convenience vehicles. Each dock of the plurality of docks may be configured to lock and charge two electric convenience vehicles and the plurality of docks may be arranged in a star configuration.

In some embodiments of the system for self-service vending of an electric convenience vehicle, the locking mechanism may include at least one of a keypad and a transceiver disposed on the electric convenience vehicle. The locking mechanism may be configured to start the electric convenience vehicle in response to receiving the code. The locking mechanism may further be configured to one of start and stop the electric convenience vehicle, in response to receiving the code, based on a state of the electric convenience vehicle.

In various embodiments, the electric convenience vehicle may be one of an electric scooter, an electric wheelchair and a standing electric convenience vehicle. The terminal may be one of a kiosk and a mobile device. The terminal may be configured to provide a training instruction on operating the electric convenience vehicle. The terminal may be configured to communicate wirelessly with the electric convenience vehicle. The terminal may be configured to receive at least one of a location information and a state information from the electric convenience vehicle.

In some embodiments, the system for self-service vending of an electric convenience vehicle may further include a reservation management system configured to communicate with the terminal. The reservation management system may be configured to store, process and communicate the reservation. The reservation management system may be configured to generate a website, to create the reservation using the website, and to communicate the reservation to the terminal. The terminal may be configured to access the website.

The system may further include a plurality of terminals located at a plurality of sites, the terminal being one of the plurality of terminals. Each site of the plurality of sites may be located in a distinct geographical location. The reservation management system may be configured to communicate with the plurality of terminals. Each site of the plurality of sites may be managed by a distinct entity. The reservation management system may be configured to manage a respective privilege of each user of a plurality users to access only a respective portion of the reservation management system. A respective portion of the reservation management system may be customizable. The plurality of users may include at least one of an administrator, a renter, and a site manager associated with one of the plurality of sites.

According to another aspect, there is provided a vending system comprising a plurality of electric convenience vehicles, each electric convenience vehicle of the plurality of electric convenience vehicles including a locking catch; a plurality of docking stations, each respective docking station including a plurality of docks, each dock including at least one locking mechanism, each locking mechanism being configured to couple to the locking catch of an electric convenience vehicle of the plurality of electric convenience vehicles to lock the electric convenience vehicle to the respective docking station, each respective docking station further including a charging station configured to charge each electric convenience vehicle that is locked to the respective docking station; and a plurality of terminals, each terminal being configured to communicate with at least one respective docking station of the plurality of docking stations, to process a reservation corresponding to an electric convenience vehicle that is locked to the respective docking station, and to unlock the electric convenience vehicle from the respective docking station based on the reservation. In some embodiments, each terminal of the plurality of terminals of the vending system may be configured to provide a user interface and to create the reservation based on information received by the user interface.

The vending system may further include a reservation management system configured to communicate with the plurality of terminals. The reservation management system may be configured to store, process and communicate a plurality of reservations corresponding to the plurality of electric convenience vehicles. Each terminal of the plurality of terminals may be configured to receive the reservation from the reservation management system.

The vending system may further include a web interface configured to communicate with the reservation management system. The web interface may be configured to receive reservation information from a user and the reservation management system may be configured to create the reservation based on the reservation information.

According to another aspect, there is provided a method of vending an electric convenience vehicle. The method may include locking a plurality of electric convenience vehicles to a docking station by coupling a respective locking catch of each electric convenience vehicle to a respective locking mechanism of the docking station; charging each of the plurality of electric convenience vehicles that is locked to the docking station; receiving a reservation for an electric convenience vehicle of the plurality of electric convenience vehicles; unlocking the electric convenience vehicle from the docking station based on the reservation; and providing a code to operate the electric convenience vehicle based on the reservation.

The method may further include providing a terminal having a user interface, the terminal being configured to communicate with the docking station. In some embodiments, receiving a reservation for an electric convenience vehicle may include receiving a first reservation for a first electric convenience vehicle using the terminal. Unlocking the electric convenience vehicle based on the reservation may include unlocking the first electric convenience vehicle based on the first reservation using the terminal. Providing the code to operate the electric convenience vehicle based on the reservation may include providing a first code to operate the first electric convenience vehicle based on the first reservation using the terminal.

The method may further include providing a reservation management system configured to communicate with the terminal. The method may include processing a plurality of reservations corresponding to the plurality of electric convenience vehicles using the reservation management system. The method may further include providing a web interface. Receiving a reservation for an electric convenience vehicle may further include receiving a second reservation for a second electric convenience vehicle using the web interface and communicating the second reservation to the terminal using the reservation management system. Unlocking the electric convenience vehicle based on the reservation may include unlocking the second electric convenience vehicle based on the second reservation using the terminal. Providing the code to operate the electric convenience vehicle based on the reservation may include providing a second code to operate the second electric convenience vehicle based on the second reservation using the terminal.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 14 illustrates an exemplary website interface for reserving an ECV by a user according to aspects of the present invention;

DETAILED DESCRIPTION

Figure 1:
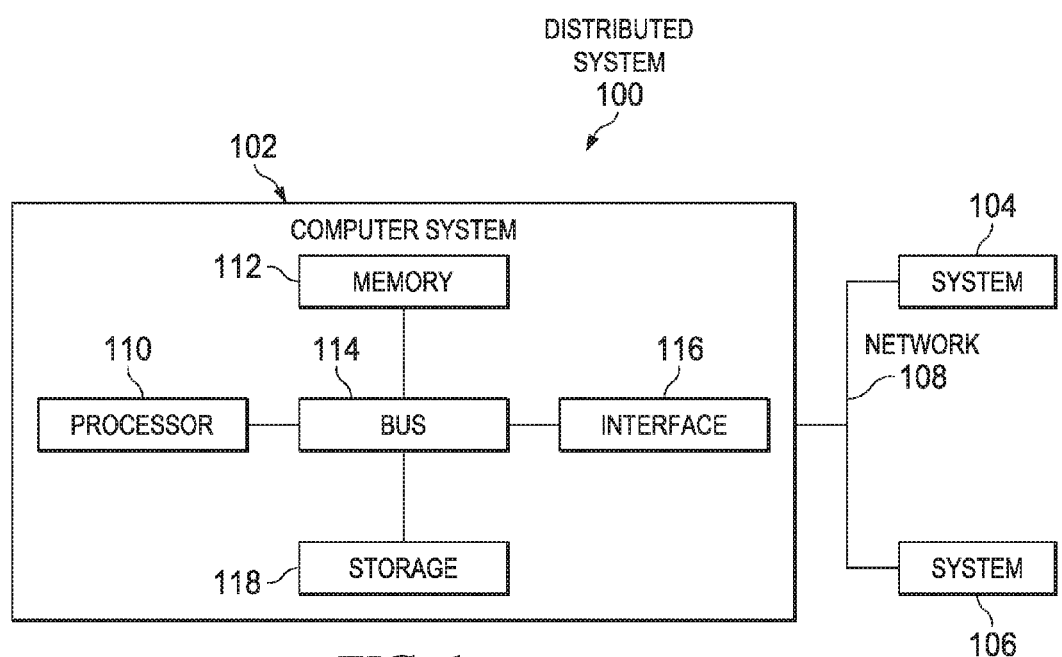
FIG. 1 is a block diagram of an exemplary computer system upon which various aspects of the present embodiments may be implemented.

Aspects and embodiments disclosed herein are directed to providing systems and methods for self-service vending of mobility vehicles. Various embodiments of the present invention address the challenges described above and enable convenient rental of mobility vehicles at large venues without requiring the attendance of service personnel. Various embodiments enable complete self-managed distribution of ECVs for personal use. At least some parts of various embodiments disclosed herein may be implemented on a computer system and may provide a convenient user interface.

As used herein, a user may refer to a user of the systems and methods disclosed herein, an entity on whose behalf a user is acting, or any entity associated with ECV rentals, without limitation. In one example, a user may be a renter. The renter may be a customer or visitor to a venue where a self service vending system is available. In another example, a user may refer to a venue or site, a site manager, a representative or employee of the venue where self service vending systems are placed. In another example, a user may refer to a self service vending system provider or an administrator of the self service vending system.

According to one embodiment, a self service vending system may include a charging station configured to charge an ECV, a locking mechanism configured to lock the ECV, and a terminal configured to process a reservation of the ECV and to provide a code for operating the ECV based on the reservation. In one example, the locking mechanism may include an electronic keypad disposed on the ECV. The locking mechanism may be configured to start the ECV, or enable the ECV to be started, in response to receiving the code provided by the terminal. In other embodiments, a self service vending system may include a docking station. The docking station may include one or more charging stations and one or more locking mechanisms for locking ECVs. An ECV may include a locking catch configured to couple with a locking mechanism of the docking station. In one example, the locking catch may be attached to the front bumper of an ECV.

Embodiments may further include a reservation management system. The reservation management system may provide a web interface to a user and may be configured to store and process reservations. The reservation management system may further be configured to manage information on users of self service vending systems. For example, a reservation management system may be configured to allow access to a respective portion or a respective interface of the reservation management system to a respective user based on that user's privileges or level of access. In some embodiments, interfaces provided by the reservation management system may be customizable to meet the needs of various users. Computer systems implementing methods of self service vending of ECVs are also disclosed.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

One or more features of the self service vending systems and methods may be implemented on one or more computer systems coupled by a network (e.g., the Internet). Example systems upon which various aspects may be implemented, as well as exemplary methods performed by those systems, are discussed in more detail below.

Computer System

Various aspects and functions described herein in accord with the present invention may be implemented as hardware, software, or a combination of hardware and software on one or more computer systems. There are many examples of computer systems currently in use. Some examples include, among others, network appliances, personal computers, workstations, mainframes, networked clients, servers, media servers, application servers, database servers, web servers, and virtual servers. Other examples of computer systems may include mobile computing devices, such as cellular phones and personal digital assistants, and network equipment, such as load balancers, routers and switches. Additionally, aspects in accord with the present invention may be located on a single computer system or may be distributed among a plurality of computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system placements and components using a variety of hardware and software configurations, and the invention is not limited to any particular distributed architecture, network, or communication protocol. Furthermore, aspects in accord with the present invention may be implemented as specially-programmed hardware and/or software.

FIG. 1 shows a block diagram of a distributed computer system 100, in which various aspects and functions in accord with the present invention may be practiced. The distributed computer system 100 may include one more computer systems. For example, as illustrated, the distributed computer system 100 includes three computer systems 102, 104 and 106. As shown, the computer systems 102, 104 and 106 are interconnected by, and may exchange data through, a communication network 108. The network 108 may include any communication network through which computer systems may exchange data. To exchange data via the network 108, the computer systems 102, 104 and 106 and the network 108 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA HOP, RMI, DCOM and Web Services. To ensure data transfer is secure, the computer systems 102, 104 and 106 may transmit data via the network 108 using a variety of security measures including TSL, SSL or VPN, among other security techniques. While the distributed computer system 100 illustrates three networked computer systems, the distributed computer system 100 may include any number of computer systems, networked using any medium and communication protocol.

Various aspects and functions in accord with the present invention may be implemented as specialized hardware or software executing in one or more computer systems including the computer system 102 shown in FIG. 1. As depicted, the computer system 102 includes a processor 110, a memory 112, a bus 114, an interface 116 and a storage system 118. The processor 110, which may include one or more microprocessors or other types of controllers, can perform a series of instructions that manipulate data. The processor 110 may be a well-known, commercially available processor such as an Intel Pentium, Intel Atom, ARM Processor, Motorola PowerPC, SGI MIPS, Sun UltraSPARC, or Hewlett-Packard PA-RISC processor, or may be any other type of processor or controller as many other processors and controllers are available. As shown, the processor 110 is connected to other system placements, including a memory 112, by the bus 114.

The memory 112 may be used for storing programs and data during operation of the computer system 102. Thus, the memory 112 may be a relatively high performance, volatile, random access memory such as a dynamic random access memory (DRAM) or static memory (SRAM). However, the memory 112 may include any device for storing data, such as a disk drive or other non-volatile storage device, such as flash memory or phase-change memory (PCM). Various embodiments in accord with the present invention can organize the memory 112 into particularized and, in some cases, unique structures to perform the aspects and functions disclosed herein.

Components of the computer system 102 may be coupled by an interconnection element such as the bus 114. The bus 114 may include one or more physical busses (for example, busses between components that are integrated within a same machine), and may include any communication coupling between system placements including specialized or standard computing bus technologies such as IDE, SCSI, PCI and InfiniBand. Thus, the bus 114 enables communications (for example, data and instructions) to be exchanged between system components of the computer system 102.

Computer system 102 also includes one or more interface devices 116 such as input devices, output devices and combination input/output devices. The interface devices 116 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 116 allow the computer system 102 to exchange information and communicate with external entities, such as users and other systems.

Storage system 118 may include a computer-readable and computer-writeable nonvolatile storage medium in which instructions are stored that define a program to be executed by the processor. The storage system 118 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 110 or some other controller may cause data to be read from the nonvolatile recording medium into another memory, such as the memory 112, that allows for faster access to the information by the processor 110 than does the storage medium included in the storage system 118. The memory may be located in the storage system 118 or in the memory 112. The processor 110 may manipulate the data within the memory 112, and then copy the data to the medium associated with the storage system 118 after processing is completed. A variety of components may manage data movement between the medium and the memory 112, and the invention is not limited thereto.

Further, the invention is not limited to a particular memory system or storage system. Although the computer system 102 is shown by way of example as one type of computer system upon which various aspects and functions in accord with the present invention may be practiced, aspects of the invention are not limited to being implemented on the computer system, shown in FIG. 1. Various aspects and functions in accord with the present invention may be practiced on one or more computers having different architectures or components than that shown in FIG. 1. For instance, the computer system 102 may include specially-programmed, special-purpose hardware, such as for example, an application-specific integrated circuit (ASIC) tailored to perform a particular operation disclosed herein. Another embodiment may perform the same function using several general-purpose computing devices running MAC OS System X with Motorola PowerPC processors and several specialized computing devices running proprietary hardware and operating systems.

The computer system 102 may include an operating system that manages at least a portion of the hardware placements included in computer system 102. A processor or controller, such as processor 110, may execute an operating system which may be, among others, a Windows-based operating system (for example, Windows NT, Windows 2000/ME, Windows XP, Windows 7, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

The processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, functions in accord with aspects of the present invention may be implemented using an object-oriented programming language, such as SmallTalk, JAVA, C++, Ada, or C# (C-Sharp). Other object-oriented programming languages may also be used. Alternatively, procedural, scripting, or logical programming languages may be used.

Additionally, various functions in accord with aspects of the present invention may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed placements, or any combination thereof. For example, a web page may be implemented using HTML while a data object called from within the web page may be written in C++. Thus, the invention is not limited to a specific programming language and any suitable programming language could also be used.

A computer system included within an embodiment may perform functions outside the scope of the invention. For instance, aspects of the system may be implemented using an existing product, such as, for example, the Google search engine, the Yahoo search engine available from Yahoo! of Sunnyvale, Calif.; the Bing search engine available from Microsoft of Seattle Wash. Aspects of the system may be implemented on database management systems such as SQL Server available from Microsoft of Seattle, Wash.; Oracle Database from Oracle of Redwood Shores, Calif.; and MySQL from Sun Microsystems of Santa Clara, Calif.; or integration software such as WebSphere middleware from IBM of Armonk, N.Y. However, a computer system running, for example, SQL Server may be able to support both aspects in accord with the present invention and databases for sundry applications not within the scope of the invention.

Exemplary Vending Systems and Methods

Various embodiments of the vending systems and methods disclosed herein may be provided by a vending system provider, such as ScooterBug, Inc. of Woburn, Mass.

Figure 2:
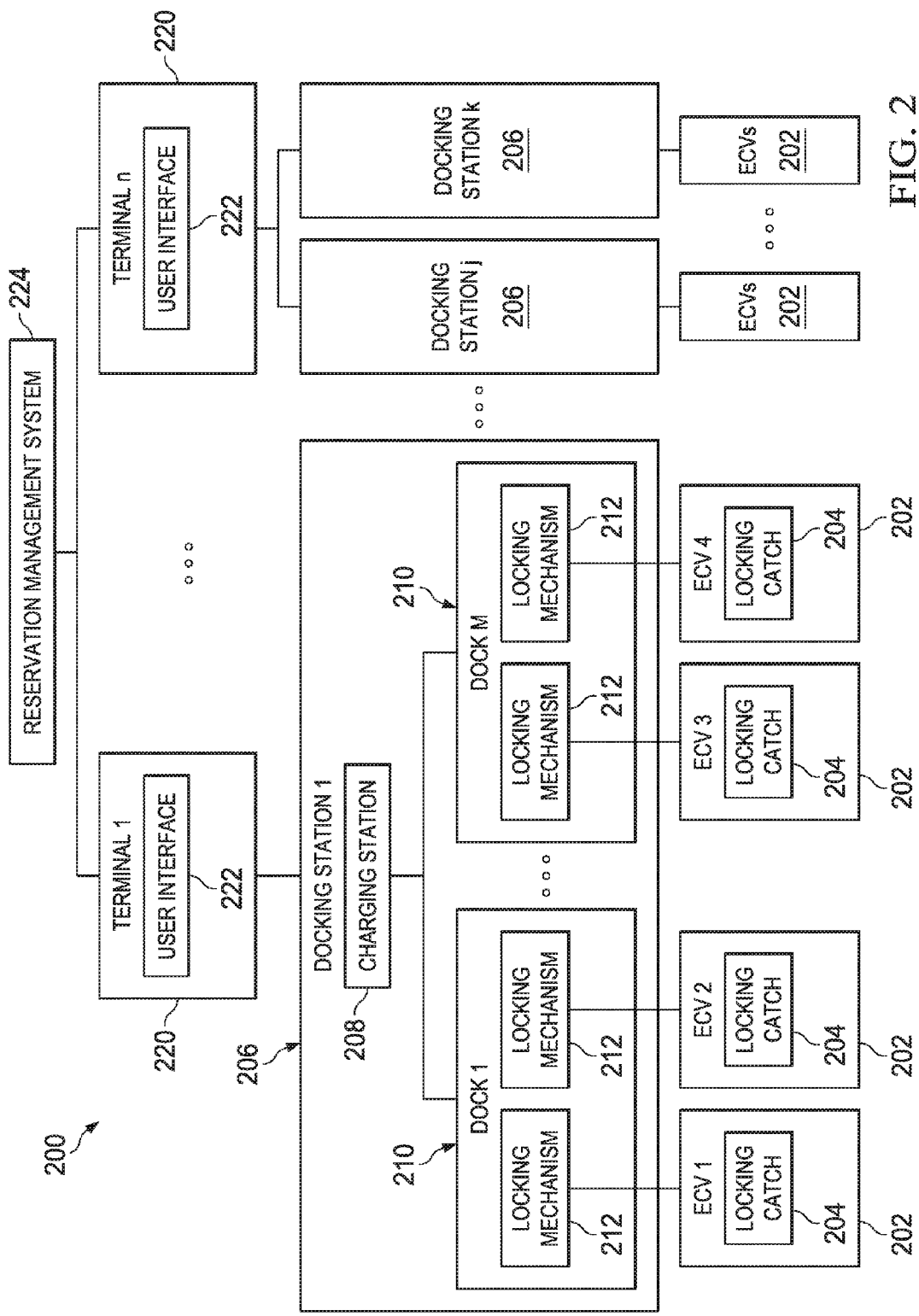
FIG. 2 is a block diagram of one embodiment of a self service vending system for ECVs according to aspects of the present invention.

An example system in accordance with aspects of the present invention can be seen in FIG. 2. The vending system 200 includes a plurality of ECVs 202. Each ECV 202 includes a locking catch 204. The vending system 200 further includes a plurality of docking stations 206. Each docking station 206 includes a charging station 208 and a plurality of docks 210. Each dock 210 includes a plurality of locking mechanisms 212. Each locking mechanism 212 is configured to physically couple with a locking catch 204 of one of the plurality of ECVs 202 so as to lock the ECV to the respective docking station 206. The locking catch 204 may be disposed at the front bumper of an ECV. The locking mechanism may be an electronic locking device. Each locking mechanism 212 is further configured to unlock so as to release the ECV from the respective docking station 206. The charging station 208 is connected to the plurality of docks 210 to provide power to locked ECVs 202. The charging station 208 may be configured to independently charge each one of the ECVs 202.

In FIG. 2, each dock 210 is shown to include two locking mechanisms. In some embodiments, each dock 210 may include one locking mechanism or any number of locking mechanisms. In FIG. 2, a docking station 206 is shown to include m docks 210. In general, a docking station 206 may include one dock or any number of docks. In FIG. 2, a docking station 206 is shown to include a single charging station 208. In general, a docking station 206 may include a plurality of charging stations. The charging stations may be included in the docks 210. Each dock may be configured to include one or more locking mechanisms and one or more charging stations. Each dock may include a power cord to plug in and recharge an ECV battery when the ECV is locked to the dock. In some embodiments, each ECV may be locked and charged individually using a dedicated locking mechanism and a dedicated charging station. In some embodiments, a charging station and a locking mechanism may be coupled to allow charging of an ECV in response to locking the ECV to the docking station. In some embodiments, the charging station may be configured to inductively charge one or more ECVs. In FIG. 2, the vending system 200 is shown to include k docking stations 206. In some embodiments, the vending system 200 may include one docking station or any number of docking stations. Each docking station may be configured to lock and charge one or more ECVs.

Referring to FIG. 2, the vending system 200 further includes a plurality of terminals 220. A terminal 220 may include a computer system as shown and described in relation with FIG. 1. A terminal 220 may be a kiosk. In some embodiments, a terminal may be a mobile device such as a cellular device. Each terminal 220 includes a user interface 222 for allowing a user to interact with the terminal. The user interface 222 may be configured to access information from a user. The information may include, for example, the name, address and contact information of a user, or a number associated with a reservation of an ECV made by a user.

Each terminal 220 is configured to process one or more reservations of one or more ECVs 202. Processing a reservation may include creating a new reservation using the terminal, and may include retrieving or receiving an existing reservation. Processing may further include receiving a payment associated with a reservation. In some embodiments, swiping a credit card at a terminal may bring up an existing reservation, access the account of the user swiping the credit card or create a new reservation for the user swiping the credit card.

Each terminal 220 is configured to communicate with at least one docking station 206. The terminals may be configured to communicate wirelessly with one or more docking stations. In other embodiments, terminals may be configured to communicate with the ECVs. In FIG. 2, terminal 1 is shown to be in communication with docking station 1, and terminal n is shown to be in communication with docking stations j and k. In various embodiments, terminals, docking stations and ECVs may be arranged to communicate in various other configurations.

An ECV may include one or more types of sensors or devices, such as a diagnostic device, a transceiver, a global positioning system (GPS) device or any other location determination device. In some embodiments, a terminal may be configured to receive at least one of a location information, a state information and a diagnostic information from an ECV. An ECV may include an RFID device or another type of proximity sensor configured to communicate with a terminal and to send operating information to the terminal. Proximity sensors may be used to identify ECVs approaching a terminal or a docking station or to identify ECVs that are locked to a docking station. A terminal may be configured to track an ECV using one or more sensors and may further be configured to turn off or lock an ECV if the ECV is taken beyond a location feasible for use at a venue.

Referring again to FIG. 2, each terminal 220 is further configured to control one or more locking mechanisms of a docking station associated with that terminal. Upon processing a reservation for an ECV, a terminal may unlock the ECV from the docking station. A terminal may further be configured to provide a code for operating an ECV based on a reservation. In some embodiments, the code may be provided to a user of the terminal for input to the ECV. In other embodiments, a terminal may be configured to communicate the code to the ECV.

The vending system 200 further includes a reservation management system 224. A reservation management system may include a computer system as shown and described in relation with FIG. 1. The reservation management system 224 is configured to communicate with the terminals 220. In other embodiments, the reservation management system may communicate with one or more docking stations or ECVs. The reservation management system 224 is further configured to store, process and communicate reservations.

Docking stations, ECVs and terminals may be placed at various distinct geographical locations within a single venue such as a theme park or a casino. Docking stations, ECVs and terminals may also be provided by a vending system provider to various different sites, located at distinct geographical locations, where each site is managed by a distinct entity. Therefore, docking stations, ECVs and terminals may be placed within different sites that may be managed by distinct entities. The reservation management system may be used by a vending system provider, for example, to manage one or more sites that are vending system customers, i.e. venues that use the vending systems disclosed herein.

In various embodiments, a reservation management system may be configured to generate one or more user interfaces. The user interfaces may be web interfaces configured to communicate over a computer network. Different web interfaces may be provided depending on the user and their access privileges. For example, the reservation management system may be configured to generate a website for renters to reserve ECVs. A renter may create a new reservation, retrieve, view or modify an existing reservation. The reservation management system may further be configured to create one or more reservations using the website and to communicate the one or more reservations to one or more terminals. In some embodiments, a terminal may be configured to access a website provided by the reservation management system. In some embodiments, a terminal may be a mobile device that may access the website.

The reservation management system may further provide a web interface for one or more site managers to access or manage reservations and rentals of ECVs located at their respective sites. The reservation management system may further provide a web interface for an administrator or a provider of the vending system 200 to various sites or venues. The administrator may access and manage information on the various users of the vending system 200, including the sites where the self-service vending systems are located as well as rental customers of these sites. The administrator may further access and manage reservations and track the assets of the vending system provider at one or more sites.

Figure 3:
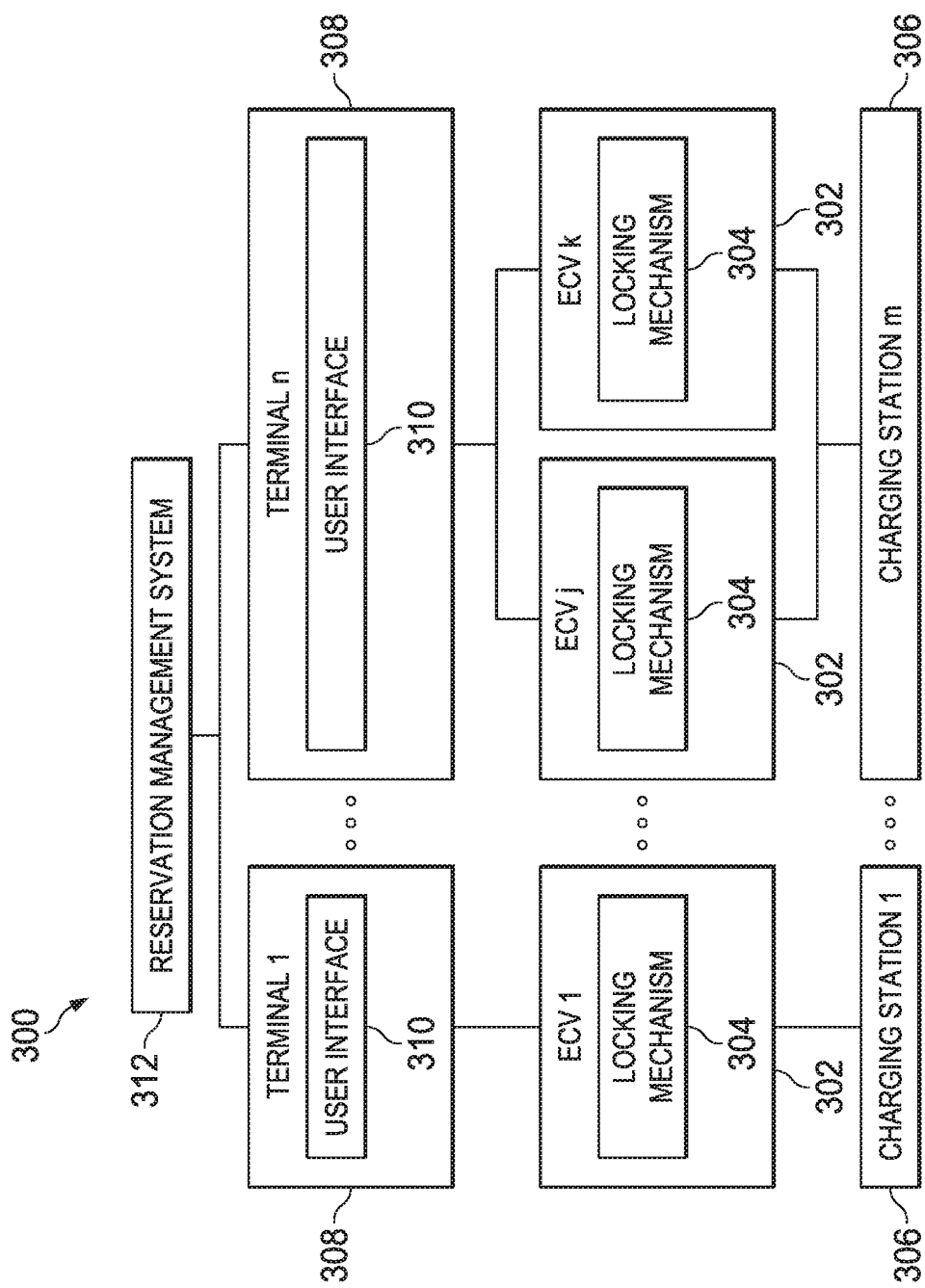
FIG. 3 is a block diagram of another exemplary embodiment of a self service vending system for ECVs according to aspects of the present invention.

In some embodiments, ECVs may be locked without the use of a docking station. Therefore, some embodiments of vending systems may not include a docking station. One example of such an embodiment is illustrated in FIG. 3. The vending system 300 includes a plurality of ECVs 302. Each ECV 302 includes a locking mechanism 304. The locking mechanism 304 may include an electronic keypad or a transceiver configured to start the ECV upon receiving a unique or preprogrammed code, or to permit the ECV to be started upon receiving the unique or preprogrammed code. An integrated electronic keypad device eliminates the need for a physical key. An electronic keypad may be configured to receive a four digit code to start and stop an ECV. The code may include any number of digits. In some embodiments, an ECV may include a transceiver that is configured to communicate with at least one of a terminal and a reservation management system. The locking mechanism may include or may be controlled by a computer system as described in exemplary embodiments of computer systems with reference to FIG. 1. A computer system provided on an ECV may be configured to perform various functions in addition to controlling the locking mechanism of the ECV. In some embodiments, the locking mechanism 304 may be configured to start and stop the ECV, based on a state of the ECV, in response to receiving the code. For example, if the ECV is operating, providing the code may turn off and lock the ECV. If the ECV is locked, providing the code may unlock and start the ECV. In lieu of docking stations, one or more charging stations 306 are provided in the vending system 300 to charge the ECVs 302. In other embodiments, the ECVs 302 may be charged by using solar panels, inductive charging or any other suitable method. A charging station 306 may be configured to charge one or more ECVs 302 as shown in FIG. 3.

The vending system 300 further includes a plurality of terminals 308, each having a user interface 310. Each terminal 308 is configured to communicate with one or more ECVs. Upon processing a reservation for an ECV, a terminal 308 is configured to provide a code based on the reservation. The code may be used to unlock the locking mechanism 304 of the ECV 302, allowing a renter to use the ECV.

Communication between an ECV 302 and a terminal 308 further allows the terminal to change a code associated with the ECV. The terminal may issue a unique starting or operating code to the ECV for each and every use. The terminal may change the code, for example, in response to ending a reservation. Changing the code associated with an ECV prevents a user from unlocking and using that ECV at the end of their reservation. An ECV may be available for rental if a code has been sent to the ECV. If an ECV is issued a code and the ECV is rented by a user, the terminal may issue the code to the user.

The vending system 300 further includes a reservation management system 312, as described above for the embodiment in FIG. 2. The reservation management system 312 is configured to communicate with the terminals 308. In some embodiments, the reservation management system 312 may be configured to communicate with the ECVs or the charging stations.

Although the vending system 300 is shown to include a plurality of terminals, a plurality of ECVs and a plurality of charging stations, in other embodiments a self service vending system may include one or more terminals, one or more ECVs and one or more charging stations. In some embodiments, the one or more ECVs being vended by a vending system may not be included in the self-service vending system. For example, the ECVs may be provided by a different entity.

Figure 4:
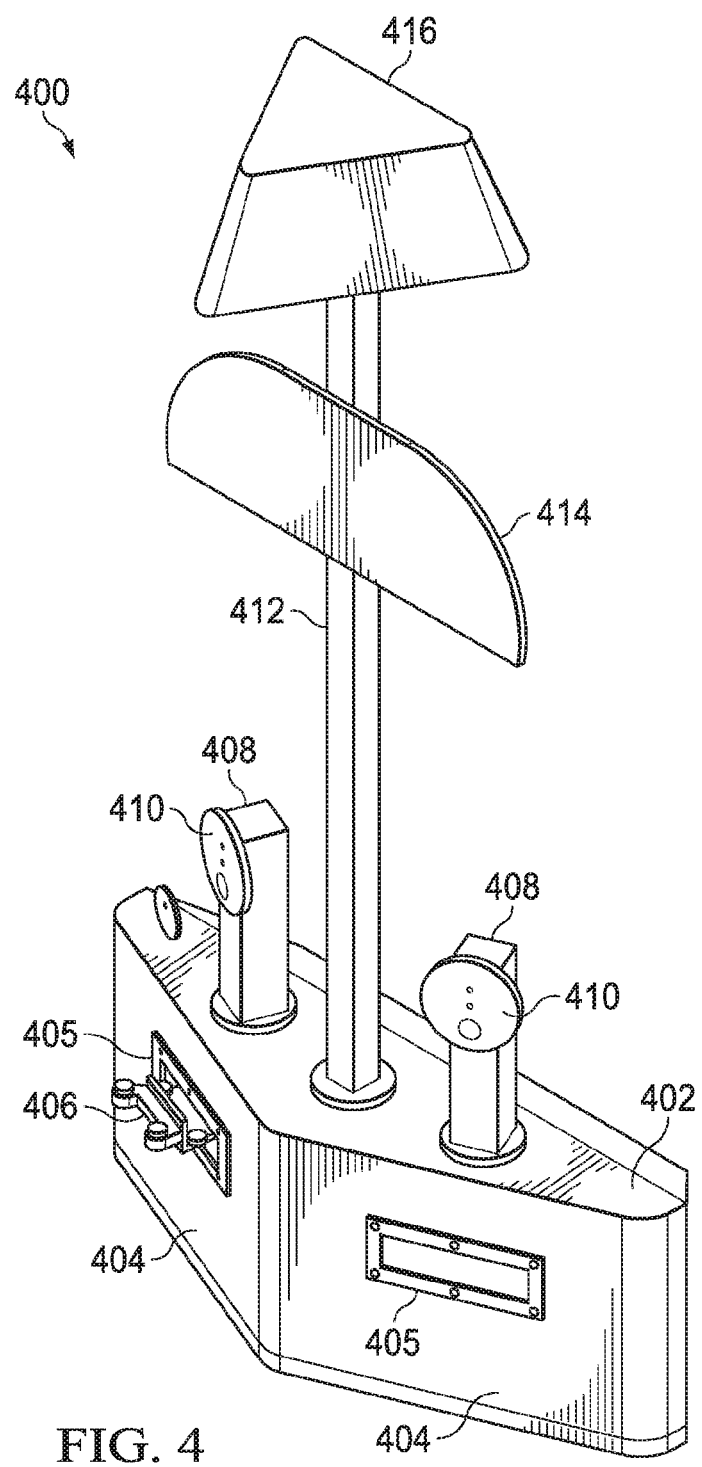
FIG. 4 is a perspective view of an embodiment of a docking station according to aspects of the present invention.

FIG. 4 illustrates one embodiment of a docking station. The docking station 400 includes a dock 402. The dock 402 includes two locking mechanisms, as illustrated in the exemplary embodiment shown in FIG. 5 and described further below. Each locking mechanism includes a housing 404 having a slot 405 for receiving a locking catch 406 of an ECV (ECV not shown). The docking station 400 further includes posts 408 for displaying a medallion number 410 associated with an ECV. An ECV that is to be stationed and locked at a dock position having a respective medallion number may have a corresponding numbered medallion attached to the ECV, thereby allowing the identification of which dock position to return the ECV. The post 408 may further allow proper aiming and alignment of an ECV for docking. The docking station 400 includes an additional post 412 supporting signage 414 and a lamp 416. Other embodiments of the docking station may not necessarily include posts, signs and lamps. In various embodiments, dock electronics and mechanical mechanisms may be enclosed in a stainless steel, galvanized steel or aluminum housing.

In some embodiments, the dock 402 may include any number of locking mechanisms. The docking station 400 may also include a plurality of docks 402, each dock having one or more locking mechanisms. A plurality of docks 402 may be grouped to form a larger docking station. The shape of the dock 402 is configured for efficient space utilization when the docks are arranged in a star configuration. However, in other embodiments, various other shapes and arrangements of the docks and the docking stations may be provided.

Figure 5:
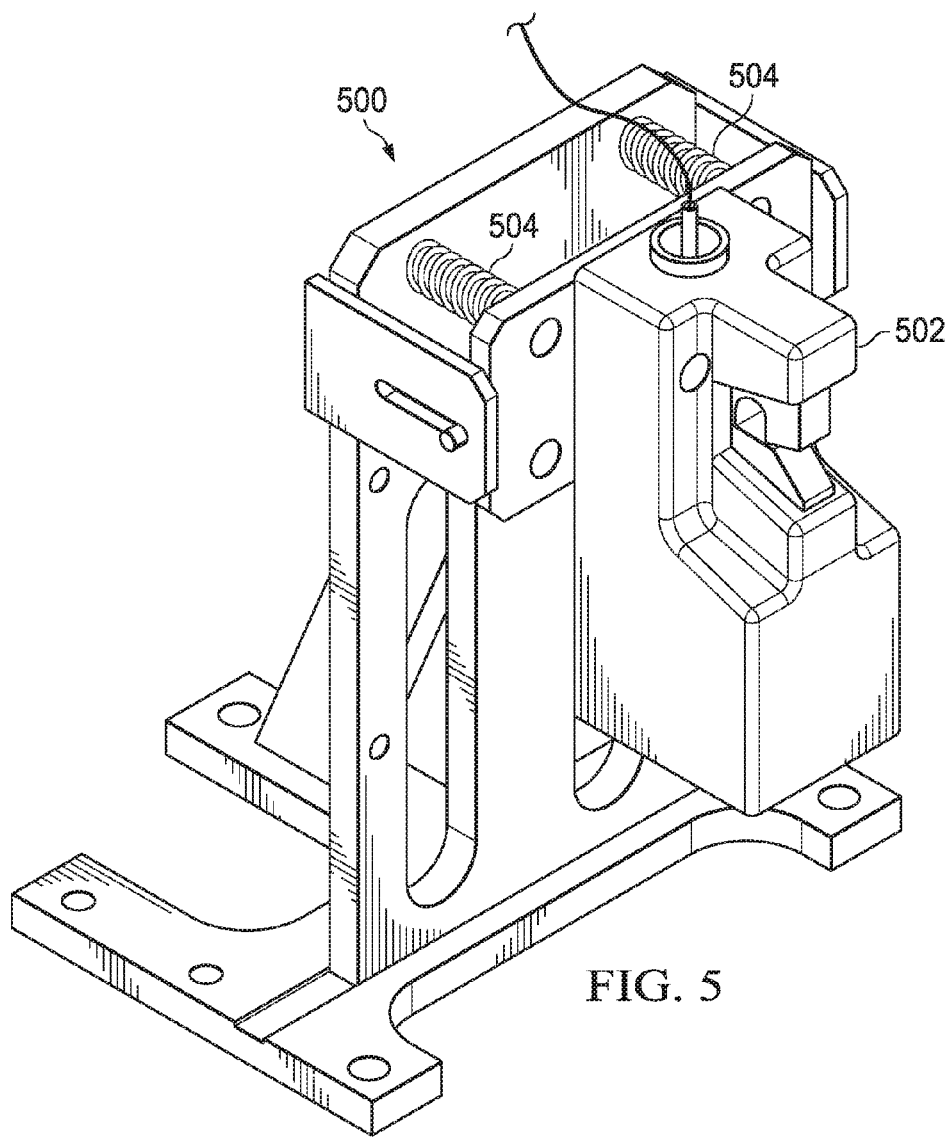
FIG. 5 is a perspective view of one example of a locking mechanism according to aspects of the present invention.

FIG. 5 illustrates one embodiment of a locking mechanism. The locking mechanism 500 may be used, for example, in the embodiment shown in FIG. 4. The locking mechanism 500 includes an electromechanical gate lock 502 and a plurality of compression springs 504 disposed behind the electromechanical gate lock. The electromechanical gate lock 502 is spring loaded and is configured to receive a locking catch of an ECV and to engage and release the locking catch. The locking mechanism 500 may be disposed within the docking station 400 in FIG. 4 such that the electromechanical gate lock 502 may receive a locking catch through a slot 405 of the housing 404. The electromechanical gate lock 502 may provide engagement and release mechanisms for locking and unlocking an ECV. The engagement mechanism may be configured to engage a locking catch of an ECV and to automatically lock in response to engaging the locking catch. In some embodiments, the locking mechanism 500 may be controlled by an interface via a wireless access point receiving signals from at least one of a terminal or a reservation management system.

Figure 6:
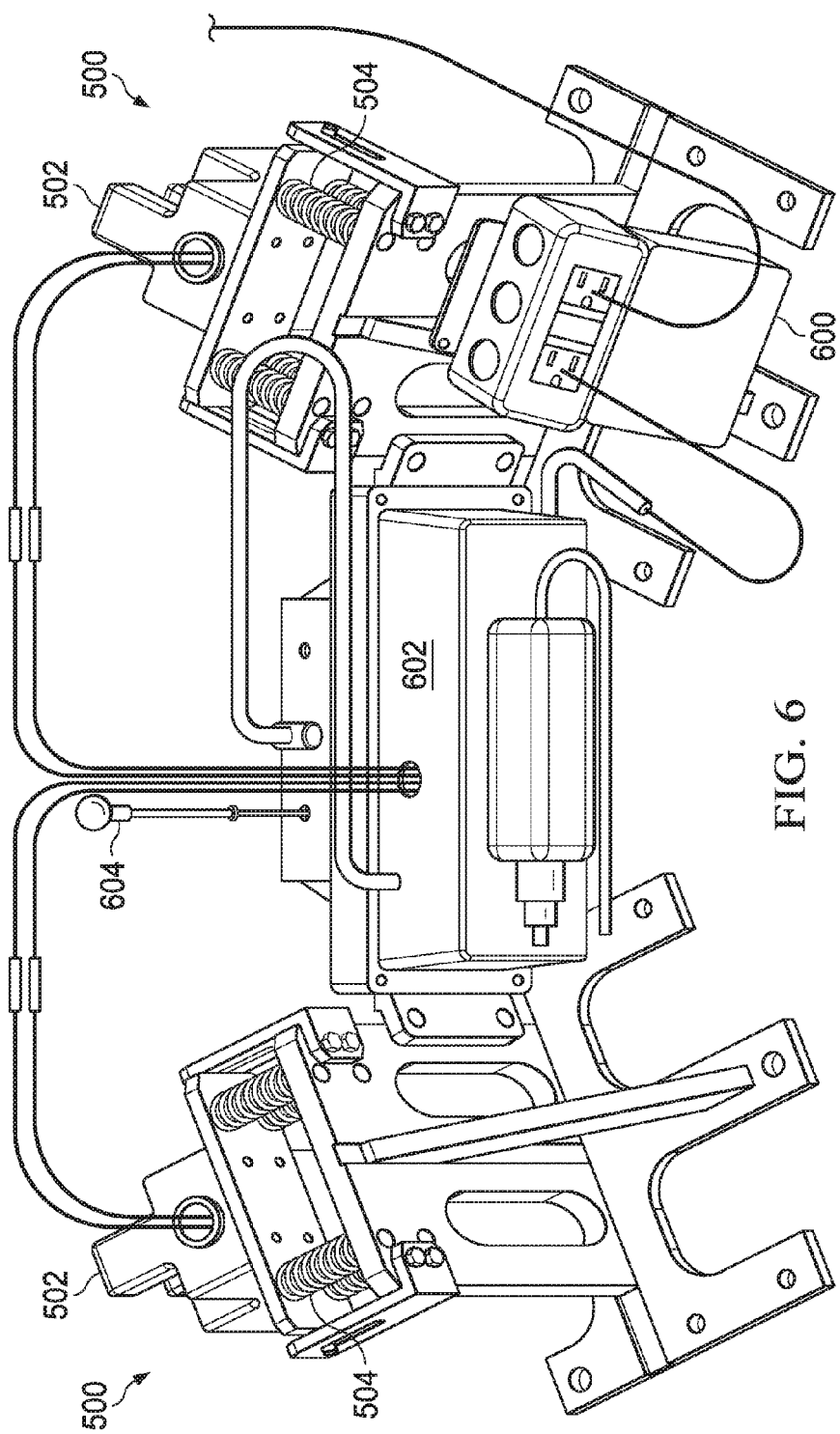
FIG. 6 is a perspective view of an interior of the docking station of FIG. 4.

FIG. 6 illustrates an interior of the docking station 400 of FIG. 4, including two locking mechanisms 500 shown in FIG. 5. The docking station 400 further includes a charging station 600 disposed behind a locking mechanism 500. In some embodiments, each locking mechanism may be associated with a corresponding charging station configured to charge a locked ECV. In other embodiments, a plurality of locking mechanisms in a dock may be associated with a single charging station. In other embodiments, each docking station may include a single charging station.

The docking station 400 further includes a communication and control assembly 602 and an antenna 604. The communication and control assembly 602 and antenna 604 may provide wireless communication with a corresponding terminal. The terminal may be configured, for example, to control the locking mechanisms 500 via the communication and control assembly 602. One or more ECVs or the reservation management system may also be configured to communicate with the docking station using the communication and control module 602.

Figure 7:
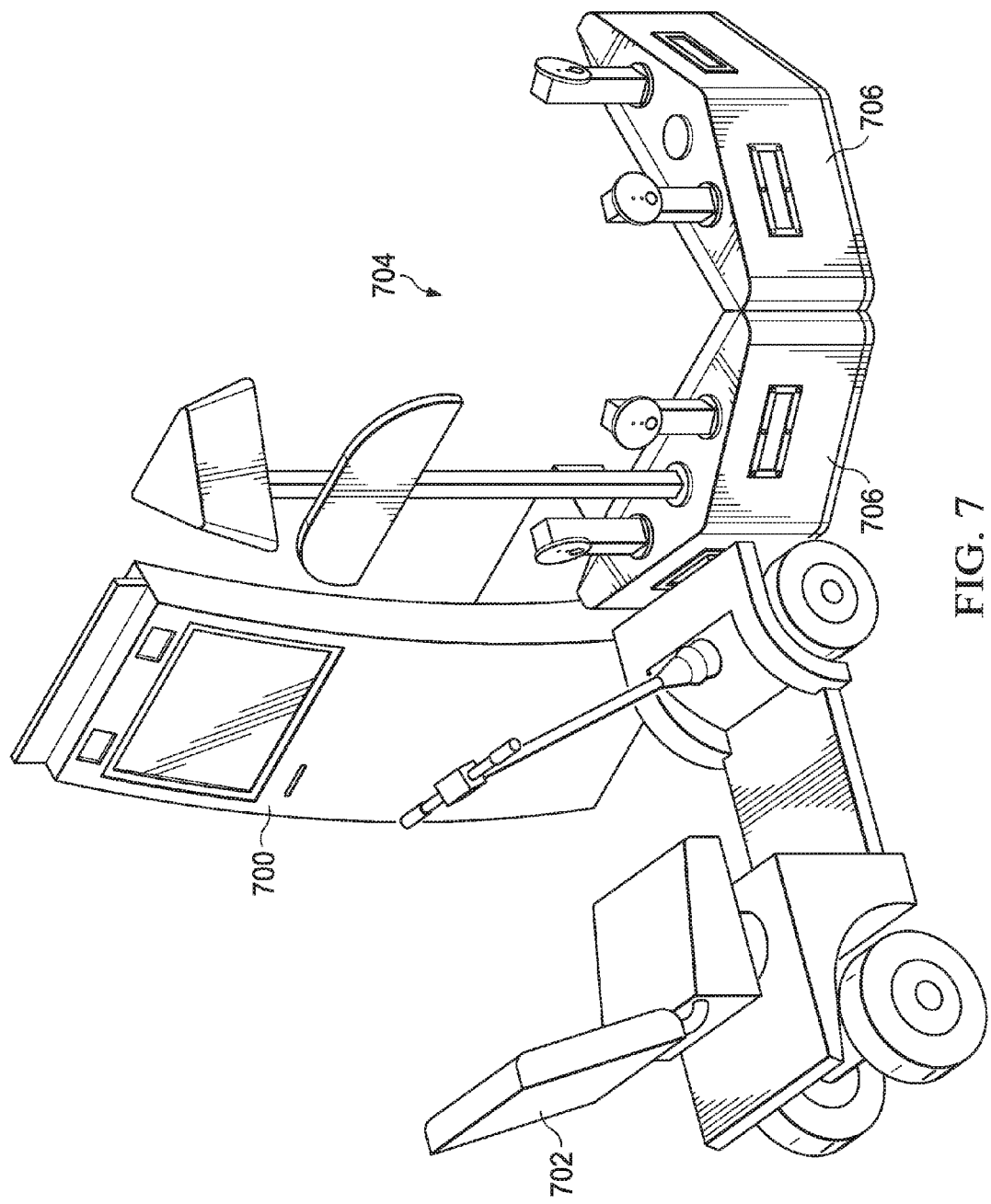
FIG. 7 is a perspective view of one embodiment of a self service vending system further illustrating a terminal and an ECV locked to one of a plurality of docks according to aspects of the present invention.

FIG. 7 shows an embodiment of a self service vending system further illustrating a terminal 700 and an ECV 702 locked to one of a plurality of locking mechanisms. The docking station 704 includes two docks 706, with each dock having two locking mechanisms as shown in FIG. 4. In various embodiments, docks may be placed in any spatial configuration. The docks may be arranged in a configuration that allows efficient space utilization. In some embodiments, docks may be arranged in a star shape, consisting of four docks, each having two locking mechanisms, with a total of eight ECV locking locations.

Figure 8:
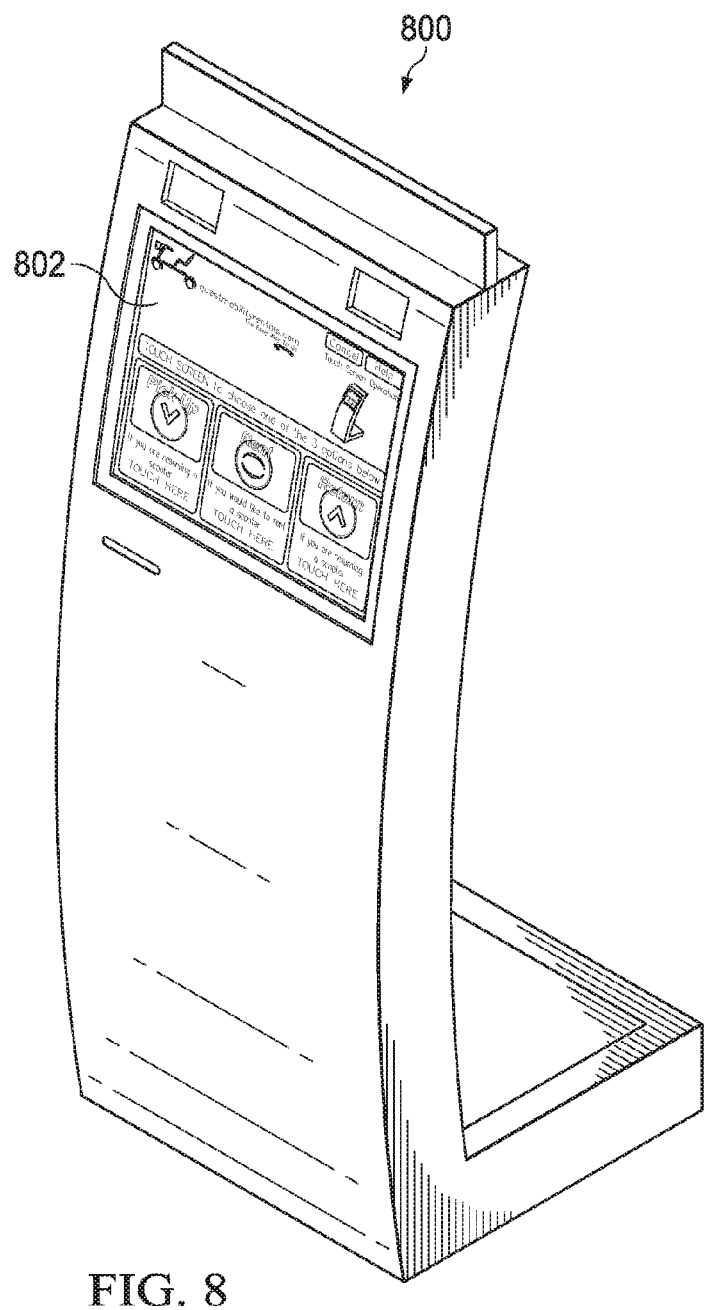
FIG. 8 is a perspective view of an embodiment of a terminal according to aspects of the present invention.

FIG. 8 illustrates one example of a terminal. The terminal 800 includes a user interface 802 output on a display. The user interface 802 may be configured to obtain information from a user and to allow a user to rent, reserve, pick up or return one or more ECVs. The terminal 800 may be used in any of the embodiments disclosed herein. In various embodiments, terminals may have various shapes and configurations. In some embodiments, a terminal may be a mobile device. For example, a terminal may be a renter's mobile device having a web interface coupled to the reservation management system of a self service vending system. The reservation management system may be in communication with docking stations or ECVs. In some embodiments, the ECVs may further be configured to communicate directly with mobile devices.

Figure 9:
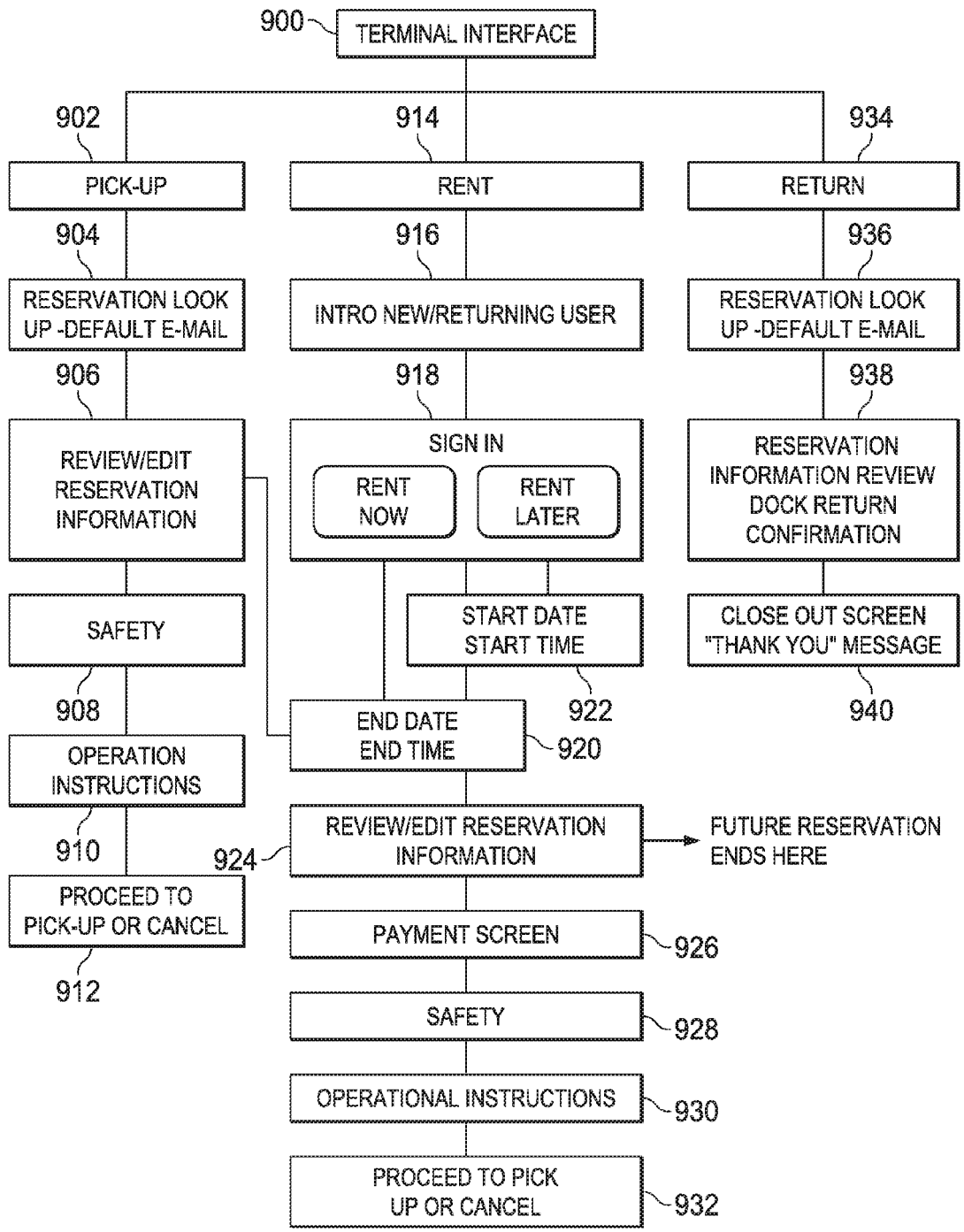
FIG. 9 is a flow chart of exemplary acts that a terminal may be configured to perform according to aspects of the present invention.

FIG. 9 is a flow chart of exemplary acts that a terminal may be configured to perform. The terminal may be configured to perform one or more of these acts in response to receiving inputs from a user via user interface 900 of the terminal. The terminal may be configured to allow a user to pick up, rent or return one or more ECVs. The act 902 of picking up a previously reserved ECV may include looking up a reservation in act 904. In one example, a reservation may be searched and retrieved based on an email address provided by the user. Reservations may be stored within the reservation management system of the self service vending system, and may also be stored in terminals. The act 902 of picking up an ECV may further include allowing a user to review or edit the retrieved reservation in act 906. As shown in FIG. 9, a user may edit, for example, start or end dates and times associated with a reservation.

Act 902 may further include providing safety training and ECV operation training instructions in acts 908 and 910.

Providing safety training in act 908 may further include providing to the user a waiver of liability for use of the ECV and receiving an agreement to the waiver of liability from the user. The user may be allowed to cancel the reservation at any time. Act 902 may further include, in act 912, providing a code for operating the ECV based on the reservation. The code may be provided to the user. In some embodiments, act 912 may further include unlocking the ECV from a docking station using the terminal. In some embodiments, act 902 may further include generating a payment screen and receiving payment associated with a reservation prior to releasing the ECV.

The act 914 of renting an ECV may include an act 916 of allowing a user to identify themselves as a new or a returning user. If a new user is selected, the user may be prompted to enter personal information such as name, address, contact information and so forth. The user information provided may then be used to establish a user account. If a user is identified as a returning user, the user may be prompted in act 918 to sign in by providing login information and an existing user account for the user may be retrieved based on the login information. A user may be provided an option to rent an ECV immediately and an option to rent an ECV at a later time. If a user selects the option to rent now, the user may be prompted in act 920 to provide an end date and time for the reservation. If a user selects the option to rent later, the user may be prompted to provide both start and end dates and times for the reservation in acts 920 and 922. A user may be allowed to review or edit the reservation information in act 924. If the reservation is for a later date, the user may end the interaction with the terminal. If the reservation starts immediately, the user may be provided a payment screen and a payment associated with the reservation may be received from the user in act 926.

Upon receipt of a payment, the act 914 of renting an ECV may then proceed similar to the act 902 of picking up an ECV. Act 914 may further include providing safety training and ECV operation training instructions in acts 928 and 930. Providing safety training in act 928 may further include providing to the user a waiver of liability for use of the ECV and receiving an agreement to the waiver of liability from the user. The user may be allowed to cancel the reservation at any time. Act 914 may further include, in act 932, providing a code for operating the ECV based on the reservation. The code may be provided to the user. In some embodiments, act 932 may further include unlocking the ECV from a docking station using the terminal.

The act 934 of returning an ECV may include looking up a reservation corresponding to the ECV in act 936. In one example, a reservation may be searched and retrieved based on an email address provided by the user. The act 934 of returning an ECV may include providing a return confirmation in act 938. In one example, an ECV may be returned to a docking station. Act 934 may further include displaying a close out screen in act 940. It is to be appreciated that one or more of the acts described in relation to FIG. 9 may be performed in a different order. The acts may also be performed substantially in parallel or may overlap. The various acts described above are exemplary and in other embodiments, a terminal may be configured to perform other functions.

Figure 10:
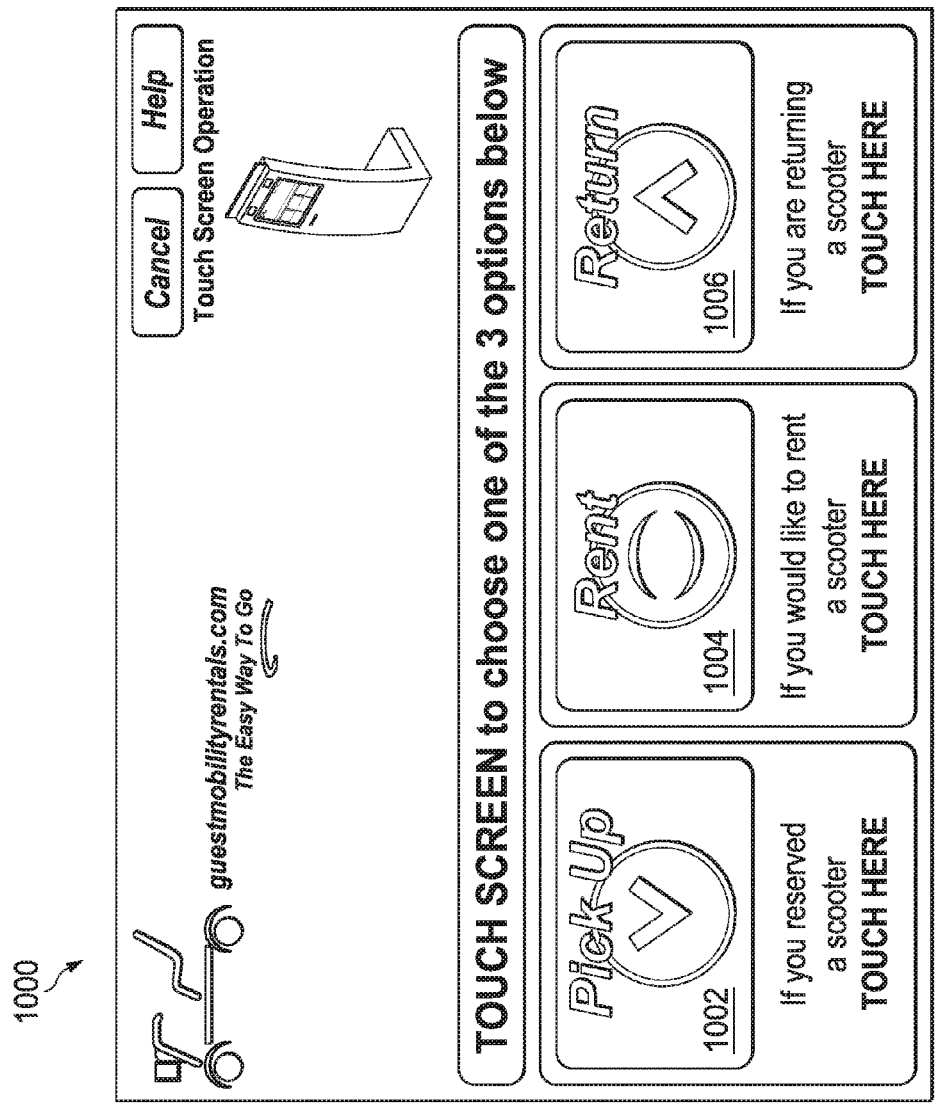
FIG. 10 illustrates an exemplary user interface that may be provided at a terminal according to aspects of the present invention.

FIG. 10 illustrates an exemplary user interface 1000 that may be provided at a terminal. The user interface 1000 may be a touch screen interface. The user interface 1000 may provide buttons that may be selected by a user to perform various functions. For example, a pick-up button 1002 may be provided to initiate act 902 of picking up an ECV as shown in FIG. 9. A rent button 1004 may be provided to initiate act 914 of renting an ECV as shown in FIG. 9. A return button 1006 may be provided to initiate act 934 of returning an ECV as shown in FIG. 9.

Figure 11A:
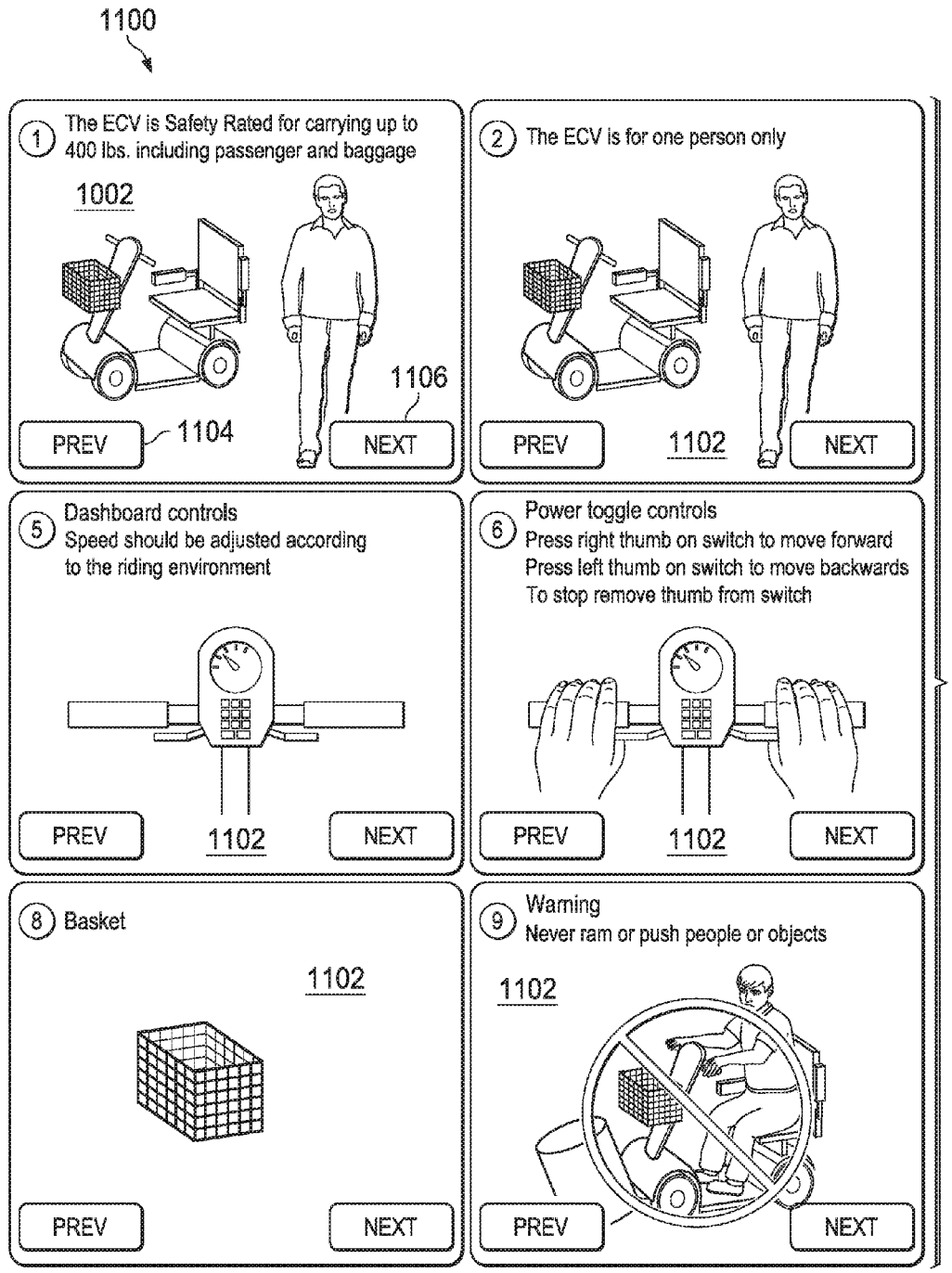
FIGS. 11A and 11B (hereinafter FIG. 11) illustrates an exemplary training instruction that may be provided at a terminal according to aspects of the present invention.
Figure 11B:
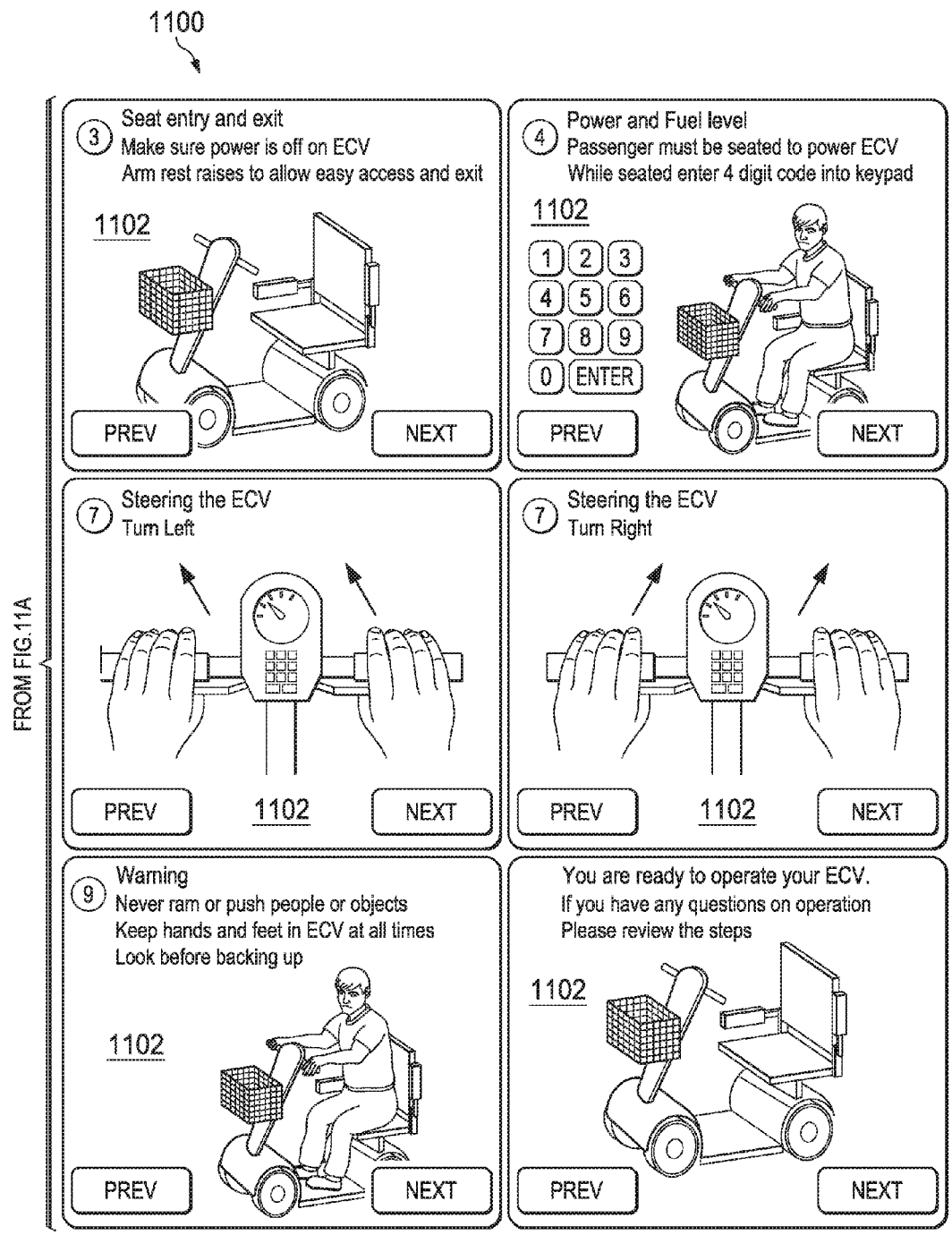

FIG. 11 illustrates an exemplary training instruction 1100 that may be provided at a terminal. The training instruction 1100 includes a series of display screens 1102. Each display screen 1102 may include a previous button 1104 and a next button 1106 to allow a user to switch among the display screens at the user's pace. The training instructions may include safety instructions and instructions on how to operate an ECV. In other embodiments, the training instructions may include other training media such as a training video. In some embodiments, a user is not permitted to use an ECV until they have reviewed all of the safety instructions. In a further embodiment, the terminal may execute a test to verify that a user has understood the safety instructions and may not permit the user to operate an ECV unless the user successfully passes the test.

Figure 12:
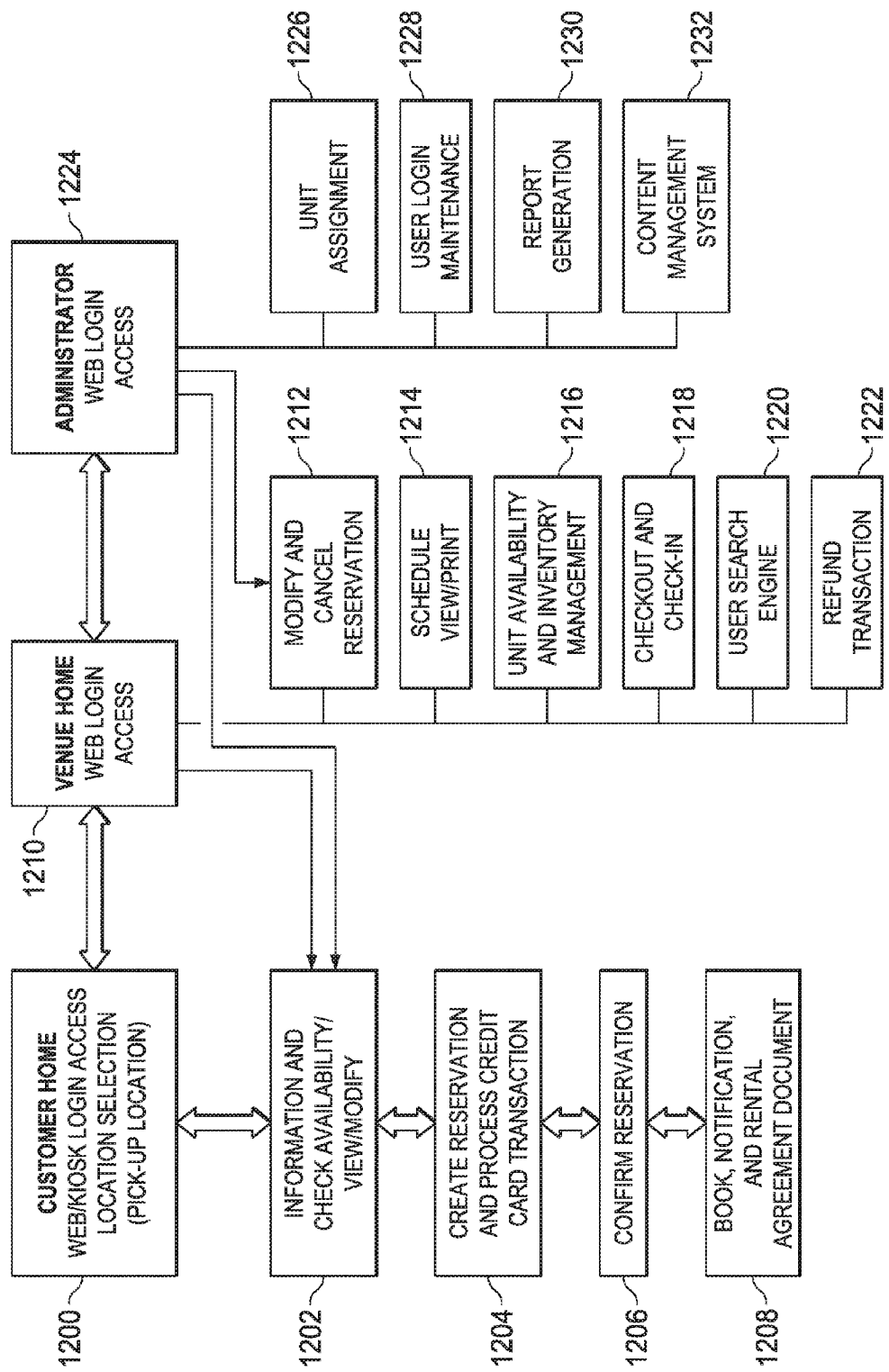
FIG. 12 is a diagram illustrating exemplary acts that a reservation management system may be configured to provide to various users having respective privileges to access respective portions of the reservation management system according to aspects of the present invention.

FIG. 12 is a diagram illustrating exemplary acts that a reservation management system, such as that shown in FIGS. 2 and 3, may be configured to provide to various users. For example, the reservation management system may provide a website that may be accessed by potential renters to reserve ECVs, as shown at block 1200. The reservation management system may further provide user interfaces for renting ECVs at terminals as shown at block 1200. A user may be prompted to select a location, such as a site or a location within a site where an ECV is to be picked up. The reservation management system may be configured to provide information to a user, to check availability of ECVs, and to allow a user to view availability information and modify a selection of ECVs as shown at block 1202. The reservation management system may further be configured to create and process a reservation as shown at block 1204, and to confirm a reservation as shown at block 1206. The reservation management system may further provide a rental agreement to a renter, book a reservation and notify a user as shown at block 1208.

A reservation management system may further provide a web interface for one or more site managers or employees to access or manage reservations and rentals of ECVs located at their respective sites or venues as shown at block 1210. Site managers or employees may further access an interface provided to renters and may be able to customize the interfaces provided by the reservation management system for rentals at their respective sites. The reservation management system may further be configured to perform other functions that may be accessed or managed by site managers. For example, the reservation management system may allow a user having site manager privilege to create, modify or cancel a reservation (block 1212), to schedule, view or print a reservation (block 1214), to check availability of ECV units, to perform inventory management functions (block 1216), to track checkout and check-in of ECVs (block 1218), to perform a user search using a user search engine (block 1220), and to process and refund transactions (block 1222).

A reservation management system may further provide a web interface for an administrator or a vending system provider as shown at block 1224. The reservation management system may allow an administrator to manage their inventory and the assignment of various assets of self service vending systems to one or more sites (block 1226). An administrator may access and manage information on the various users, including the sites where the self-service vending systems are located as well as rental customers of these sites. An administrator may further maintain the accounts and interfaces provided to various users (block 1228). A reservation management system may further be configured to allow an administrator to access reservations and to generate various types of reports (block 1230). A reservation management system may further include a content management system (block 1232).

The acts shown in FIG. 12 are exemplary and a reservation management system may further implement other functions. It is to be appreciated that one or more of the acts in FIG. 12 may be performed in a different order. The acts may also be performed substantially in parallel or may overlap. In various embodiments, a reservation management system may be configured to manage reservations at both self service vending systems and staffed rental locations.

Figure 13:
FIG. 13 illustrates an exemplary website interface that may be provided by a reservation management system according to aspects of the present invention.

FIG. 13 illustrates an exemplary website interface that may be provided by a reservation management system. The web page 1300 includes a section 1302 for displaying descriptive text and images. The website may provide, for example, information on the vending systems, the ECVs that may be rented, and locations where ECVs may be available. The web page 1300 includes a user login section 1304. The web page 1300 provides a map 1306 for displaying locations where ECVs are available, and a search engine for searching the availability of ECVs for rental by location or venue.

FIG. 14 illustrates another web page 1400 for reserving an ECV by a user. The web page 1400 includes a section 1402 providing information on rental locations and a section 1404 providing information on pricing of ECVs. The web page 1400 further includes an interface 1406 configured to receive reservation information from a user. The reservation information may include, for example, a venue where a user desires to use the ECV, a location within a venue, a type of ECV being requested, and start and end dates and times of the reservation. The website may further include additional web pages that allow a user to interact with the reservation management system.

Figure 15:
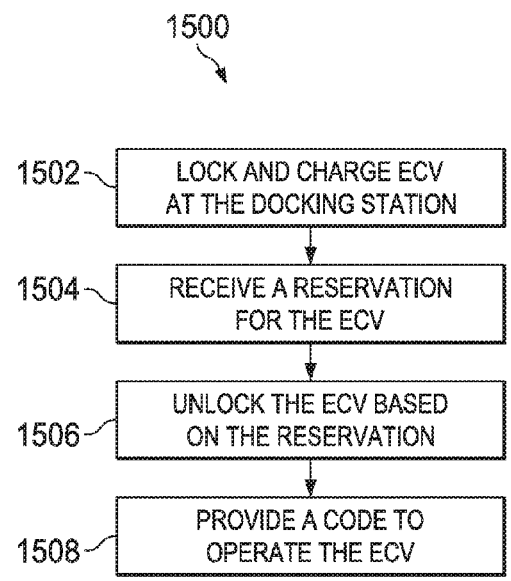
FIG. 15 is a flow chart illustrating an exemplary method of vending an ECV according to aspects of the present invention.

FIG. 15 illustrates an exemplary method 1500 of vending an ECV. In some embodiments, the method 1500 may be embedded in a module, plugin, or component of a self service vending system, such as that offered by ScooterBug, Inc. of Woburn, Mass. In other embodiments, the method 1500 may be implemented in a stand-alone application that performs the functions described herein.

The method 1500 includes an act 1502 of locking and charging an ECV at a docking station, as described for example in relation with FIG. 2. The method may include locking a plurality of ECVs to the docking station. One or more ECVs may be locked to the docking station by coupling a respective locking catch of each ECV to a respective locking mechanism of the docking station. The method may further include charging the plurality of ECVs. The method 1500 includes an act 1504 of receiving a reservation for an ECV. In one example, a reservation may be received through a web interface provided by a reservation management system. In another example, a reservation may be received through a terminal. A reservation received through a terminal may be communicated to the reservation management system. The method 1500 further includes unlocking the ECV from the docking station based on the reservation in act 1506 and providing a code to operate the ECV based on the reservation in act 1508. Acts 1506 and 1508 may be performed or controlled by at least one of a terminal or a reservation management system. In some embodiments, the method 1500 may further include printing one or more of the code, the reservation information and an ECV identifier such as a medallion number associated with the reserved ECV. In some embodiments, the code may be input to an electronic keypad of the ECV or communicated to a transceiver disposed on the ECV, thereby allowing control of the ECV by a user. In various embodiments, the acts 1502 to 1508 of method 1500 may be performed in a different order, may overlap or may be performed substantially in parallel.

In various embodiments, the method 1500 may further include providing a terminal having a user interface as shown for example in FIGS. 8 to 10. The terminal may be configured to communicate with the docking station. In some embodiments, the terminal may also be configured to communicate with one or more ECVs. The terminal may be configured to receive one or more reservations for an ECV. The terminal may communicate with the docking station to unlock an ECV based on a reservation. The terminal may also provide the code to allow a user to operate the unlocked ECV.

In various embodiments, the method 1500 may further include providing a reservation management system that may be configured to communicate with one or more terminals. The method 1500 may include processing one or more reservations using the reservation management system. Processing may include receiving one or more reservations through a terminal or through a web interface. Docking stations and ECVs may be directly controlled by the reservation management system. For example, the reservation management system may unlock one or more ECVs from one or more docking stations based on one or more reservations. In other embodiments, reservations may be communicated to corresponding terminals that may communicate with docking stations to unlock ECVs based on the reservations.

The method 1500 of FIG. 15 includes locking an ECV to a docking station. In other embodiments, a method of vending an ECV may be based on a vending system that does not include a docking station, as shown for example in the embodiment of FIG. 3. An ECV may instead be locked using a locking mechanism disposed on the ECV. The locking mechanism may include an electronic keypad or a transceiver. The method may include charging an ECV using a charging station. In some embodiments, unlocking an ECV based on the reservation and providing a code to operate the ECV may be a single act. Each ECV may be preprogrammed with a code that must be input by a user to operate the ECV. The code associated with an ECV may be changed, for example, in response to ending a reservation. Changing the code associated with an ECV prevents a user from unlocking and using that ECV at the end of their reservation. Therefore, in various embodiments, a method of vending an ECV may include programming ECV codes and providing codes to users based on reservations. Programming ECV codes and providing codes to users may be performed by at least one of a terminal or a reservation management system.

Figure 16:
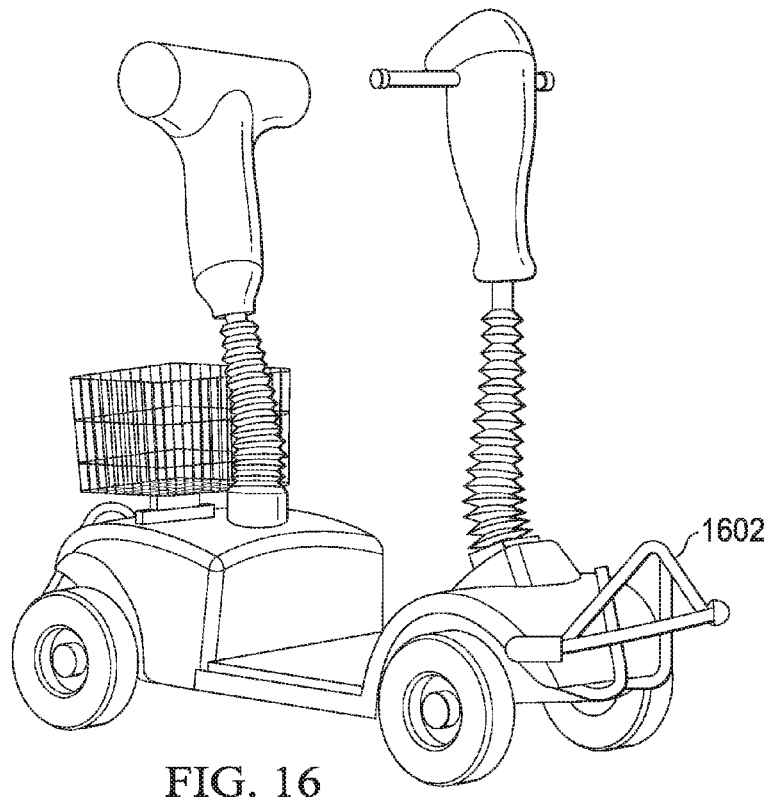
FIG. 16 is a perspective view of one embodiment of a standing ECV according to aspects of the present invention.

Various embodiments of the vending systems and methods disclosed herein may be used with different types of ECVs. For example, an ECV may be an electric scooter or an electric wheelchair. FIG. 7 shows one exemplary embodiment of an ECV 702. FIG. 16 shows another exemplary embodiment of an ECV. The embodiment in FIG. 16 is a standing ECV or SECV. A standing ECV allows a user to be upright and in a standing position. The standing ECV includes a locking catch 1602 as illustrated in FIG. 16. Various embodiments of the vending systems and methods may include a plurality of different types of ECVs.

Any embodiment disclosed herein may be combined with any other embodiment, and references to "an embodiment," "some embodiments," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. Such terms as used herein are not necessarily all referring to the same embodiment. Any embodiment may be combined with any other embodiment in any manner consistent with the aspects disclosed herein. References to "or" may be construed as inclusive so that any terms described using "or" may indicate any of a single, more than one, and all of the described terms. Furthermore, it will be appreciated that the systems and methods disclosed herein are not limited to any particular application or field, but will be applicable to any endeavor wherein a value is apportioned among several placements.

Where technical features in the drawings, detailed description or any claim are followed by references signs, the reference signs have been included for the sole purpose of increasing the intelligibility of the drawings, detailed description, and claims. Accordingly, neither the reference signs nor their absence are intended to have any limiting effect on the scope of any claim placements.

Having now described some illustrative aspects of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention.

What is claimed is:

1. A system for self-service vending of an electric convenience vehicle, the system comprising:
   a docking station, the docking station including:
   one or more docks, each dock including a locking mechanism configured to receive a locking catch positioned at a front bumper of the electric convenience vehicle, and to engage the locking catch to lock the electric convenience vehicle to the dock,
   one or more posts positioned above the locking mechanism and vertically aligned with the locking mechanism to indicate to a user of the electric convenience vehicle proper alignment of the locking catch during docking of the electric convenience vehicle, and
   a charging station configured to charge the electric convenience vehicle when the locking catch is engaged with the locking mechanism; and
   a terminal including a user interface to provide a plurality of instructions to the user of the electric convenience vehicle relating to safety and operation of the electric convenience vehicle and to receive feedback from the user of the electric convenience vehicle indicating the user has reviewed the plurality of instructions, the terminal being configured to process a reservation of the electric convenience vehicle and to provide a code for operating the electric convenience vehicle based on the reservation and the feedback indicating the user has reviewed the plurality of instructions.

2. The system of claim 1, wherein the terminal is further configured to control the locking mechanism so as to unlock the electric convenience vehicle from the docking station based on the reservation.

3. The system of claim 2, wherein the docking station is further configured to communicate wirelessly with the terminal.

4. The system of claim 1, wherein the charging station and the locking mechanism are coupled to allow charging of the electric convenience vehicle in response to locking the electric convenience vehicle to the docking station.

5. The system of claim 1, wherein the locking mechanism includes an engagement mechanism configured to lock the electric convenience vehicle to the docking station and a release mechanism configured to unlock the electric convenience vehicle from the docking station.

6. The system of claim 5, wherein the engagement mechanism is configured to engage the locking catch of the electric convenience vehicle and to automatically lock in response to engaging the locking catch.

7. The system of claim 1, wherein the charging station is configured to independently charge each one of a plurality of electric convenience vehicles.

8. The system of claim 7, wherein the docking station further includes a plurality of locking mechanisms, each locking mechanism of the plurality of locking mechanisms being configured to lock and unlock a respective one of the plurality of electric convenience vehicles.

9. The system of claim 8, wherein the docking station further includes a plurality of docks, each dock of the plurality of docks including at least one locking mechanism of the plurality of locking mechanisms and each dock being configured to lock and charge at least one of the plurality of electric convenience vehicles.

10. The system of claim 9, wherein each dock of the plurality of docks is configured to lock and charge two electric convenience vehicles and the plurality of docks are arranged in a star configuration.

11. The system of claim 1, wherein the locking mechanism includes at least one of a keypad and a transceiver disposed on the electric convenience vehicle, the locking mechanism being configured to start the electric convenience vehicle in response to receiving the code.

12. The system of claim 11, wherein the locking mechanism is further configured to one of start and stop the electric convenience vehicle, in response to receiving the code, based on a state of the electric convenience vehicle.

13. The system of claim 1, wherein the terminal is one of a kiosk and a mobile device.

14. The system of claim 1, wherein the electric convenience vehicle is one of an electric scooter, an electric wheelchair and a standing electric convenience vehicle.

15. The system of claim 1, wherein the terminal is further configured to provide a test to the user relating to the safety instructions, and wherein the user is not permitted to operate the electric convenience vehicle unless the user successfully passes the test.

16. The system of claim 1, wherein the terminal is further configured to communicate wirelessly with the electric convenience vehicle.

17. The system of claim 16, wherein the terminal is further configured to receive at least one of a location information and a state information from the electric convenience vehicle.

18. The system of claim 1, wherein the charging station is further configured to inductively charge the electric convenience vehicle.

19. The system of claim 1, wherein the terminal is configured to process the reservation by at least one of creating the reservation and receiving the reservation.

20. The system of claim 1, wherein the terminal is further configured to receive a payment associated with the reservation.

21. The system of claim 1, further comprising a reservation management system configured to communicate with the terminal, the reservation management system being further configured to store, process and communicate the reservation.

22. The system of claim 21, wherein the reservation management system is further configured to generate a website, to create the reservation using the website, and to communicate the reservation to the terminal.

23. The system of claim 22, wherein the terminal is further configured to access the website.

24. The system of claim 21, further comprising a plurality of terminals located at a plurality of sites, each site of the plurality of sites being located in a distinct geographical location, the terminal being one of the plurality of terminals, wherein the reservation management system is further configured to communicate with the plurality of terminals.

25. The system of claim 24, wherein each site of the plurality of sites is managed by a distinct entity.

26. The system of claim 24, wherein the reservation management system is further configured to manage a respective privilege of each user of a plurality users to access only a respective portion of the reservation management system.

27. The system of claim 26, wherein the plurality of users includes at least one of an administrator, a renter, and a site manager associated with one of the plurality of sites.

28. The system of claim 26, wherein a respective portion of the reservation management system is customizable.

29. The system of claim 1, wherein the docking station further comprises one or more proximity sensors configured to identify the electric convenience vehicle approaching the docking station during docking.

30. The system of claim 1, wherein the docking station further comprises one or more proximity sensors configured to identify the electric convenience vehicle locked to the dock.

31. A vending system comprising:
    a plurality of electric convenience vehicles, each electric convenience vehicle of the plurality of electric convenience vehicles including a locking catch positioned at a front bumper of the electric convenience vehicle;
    a plurality of docking stations, each respective docking station including:
        a plurality of docks, each dock including at least one locking mechanism, each locking mechanism being configured to couple to the locking catch of an electric convenience vehicle of the plurality of electric convenience vehicles to lock the electric convenience vehicle to the respective docking station,
        one or more posts positioned above the at least one locking mechanism of each dock and vertically aligned with the locking mechanism to indicate to a user of the electric convenience vehicle proper alignment of the locking catch during docking of the electric convenience vehicle, and
        a charging station configured to charge each electric convenience vehicle that is locked to the respective docking station; and
    a plurality of terminals, each terminal being configured to communicate with at least one respective docking station of the plurality of docking stations, to provide a plurality of instructions to the user of an electric convenience vehicle that is locked to the at least one respective docking station relating to safety and operation of the electric convenience vehicle that is locked to the at least one respective docking station, to receive feedback indicating the user has reviewed the plurality of instructions, to process a reservation corresponding to the electric convenience vehicle that is locked to the at least one respective docking station, and to unlock the electric convenience vehicle from the at least one respective docking station based on the reservation and the feedback indicating the user has reviewed the plurality of instructions.

32. The vending system of claim 31, wherein each terminal of the plurality of terminals is further configured to provide a user interface to provide the plurality of instructions and receive the feedback and to create the reservation based on information received by the user interface.

33. The vending system of claim 32, further comprising:
    a reservation management system configured to communicate with the plurality of terminals, the reservation management system being further configured to store, process and communicate a plurality of reservations corresponding to the plurality of electric convenience vehicles.

34. The vending system of claim 33, wherein each terminal of the plurality of terminals is further configured to receive the reservation from the reservation management system.

35. The vending system of claim 34, further comprising:
    a web interface configured to communicate with the reservation management system, the web interface being configured to receive reservation information from the user;
    wherein the reservation management system is further configured to create the reservation based on the reservation information.

36. The vending system of claim 31, wherein each respective docking station further comprises one or more proximity sensors configured to identify the electric convenience vehicle approaching the docking station during docking.

37. The vending system of claim 31, wherein each respective docking station further comprises one or more proximity sensors configured to identify the electric convenience vehicle locked to the dock.

38. A method of vending an electric convenience vehicle, the method comprising:
    locking a plurality of electric convenience vehicles to a docking station by coupling a respective locking catch of each electric convenience vehicle to a respective locking mechanism of the docking station, wherein the respective locking catch is positioned at a front bumper of the electric convenience vehicle;
    charging each of the plurality of electric convenience vehicles that is locked to the docking station;
    receiving a reservation for an electric convenience vehicle of the plurality of electric convenience vehicles;
    providing a plurality of instructions to a user of the electric convenience vehicle directed to safety and operation of the electric convenience vehicle;
    receiving feedback indicating the user has reviewed the plurality of instructions;
    unlocking the electric convenience vehicle from the docking station based on the reservation;
    providing a code to operate the electric convenience vehicle and the feedback indicating the user has reviewed the plurality of instructions; and
    providing one or more posts positioned above the respective locking mechanism of the docking station and vertically aligned with the locking mechanism to indicate to the user of the electric convenience vehicle proper alignment of the locking catch during docking of the electric convenience vehicle.

39. The method of claim 38, further comprising:
    providing a terminal having a user interface to display the plurality of instructions and to receive the feedback from the user, the terminal being configured to communicate with the docking station;
    wherein receiving a reservation for an electric convenience vehicle includes receiving a first reservation for a first electric convenience vehicle using the terminal;

wherein unlocking the electric convenience vehicle from the docking station and providing the code to operate the electric convenience vehicle based on the reservation and the feedback includes providing a first code to operate the first electric convenience vehicle based on the first reservation and the feedback using the terminal.

40. The method of claim 39, further comprising:
providing a reservation management system configured to communicate with the terminal; and
processing a plurality of reservations corresponding to the plurality of electric convenience vehicles using the reservation management system.

41. The method of claim 40, further comprising providing a web interface;
wherein receiving a reservation for an electric convenience vehicle further includes receiving a second reservation for a second electric convenience vehicle using the web interface and communicating the second reservation to the terminal using the reservation management system.

42. The method of claim 38, further comprising identifying, by a proximity sensor, one of the plurality of electric convenience vehicles approaching the docking station during docking.

43. The method of claim 38, further comprising identifying, by a proximity sensor, one of the electric convenience vehicles locked to the dock.

* * * * *